(12) United States Patent
Douglass

(10) Patent No.: US 6,520,044 B1
(45) Date of Patent: Feb. 18, 2003

(54) BRAKE PEDAL SHOCK ABSORBER AND METHOD

(75) Inventor: John Michael Douglass, Newfields, NH (US)

(73) Assignee: Acutex, Inc., Whitehall, MI (US)

( * ) Notice: Subject to any disclaimer, the term of this patent is extended or adjusted under 35 U.S.C. 154(b) by 0 days.

(21) Appl. No.: 09/585,071

(22) Filed: Jun. 1, 2000

(51) Int. Cl.[7] .................. G05G 1/14; B60T 13/00; F15B 9/10
(52) U.S. Cl. .................. 74/512; 303/1; 60/547.1; 91/373; 91/376 R; 192/109 F
(58) Field of Search .................. 74/512, 513; 303/1, 303/114.1; 60/547.1; 91/373, 376 R, 367; 192/1.33

(56) References Cited

U.S. PATENT DOCUMENTS

| 4,887,869 A | * | 12/1989 | Nishii et al. ............... 303/114 |
| 4,892,361 A | * | 1/1990 | Nishii et al. ............... 303/114 |
| 4,903,487 A | * | 2/1990 | Leiber .................... 60/547.1 |
| 4,920,857 A | * | 5/1990 | Horiuchi et al. .............. 91/373 |
| 4,930,607 A | * | 6/1990 | Shimamura et al. ......... 192/1.33 |
| 5,245,829 A | * | 9/1993 | Osterday et al. ............ 60/547.1 |
| 5,927,821 A | * | 7/1999 | Bauer et al. .................. 303/1 |
| 6,109,164 A | * | 8/2000 | Okuhara et al. .......... 91/376 R |
| 6,282,388 B1 | * | 9/2001 | Brewer ...................... 74/512 |
| 6,345,555 B1 | * | 2/2002 | Tsubouchi et al. ............ 91/367 |

FOREIGN PATENT DOCUMENTS

| EP | 0 771 705 A1 | * | 8/1996 | ............ 74/512 |
| JP | 57-164848 | * | 10/1982 | ............ 91/367 |
| JP | 10-310048 | * | 11/1998 | ............ 91/367 |

* cited by examiner

Primary Examiner—Vinh T. Luong
(74) Attorney, Agent, or Firm—Haynes and Boone LLP

(57) ABSTRACT

A shock absorber for coupling a brake pedal lever arm to a brake booster push rod. The application of impact forces to the brake booster push rod is sensed and the brake pedal lever arm is no longer rigidly coupled to a brake booster push rod. The impact forces applied to the brake booster push rod are then absorbed by the shock absorber. Finally, after the cessation of the impact forces, the brake pedal lever arm is once again rigidly coupled to the brake booster push rod.

10 Claims, 5 Drawing Sheets

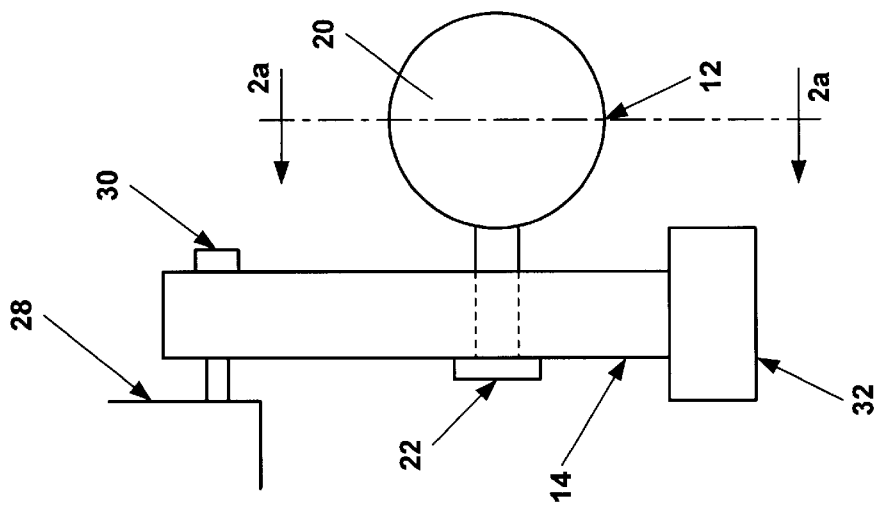
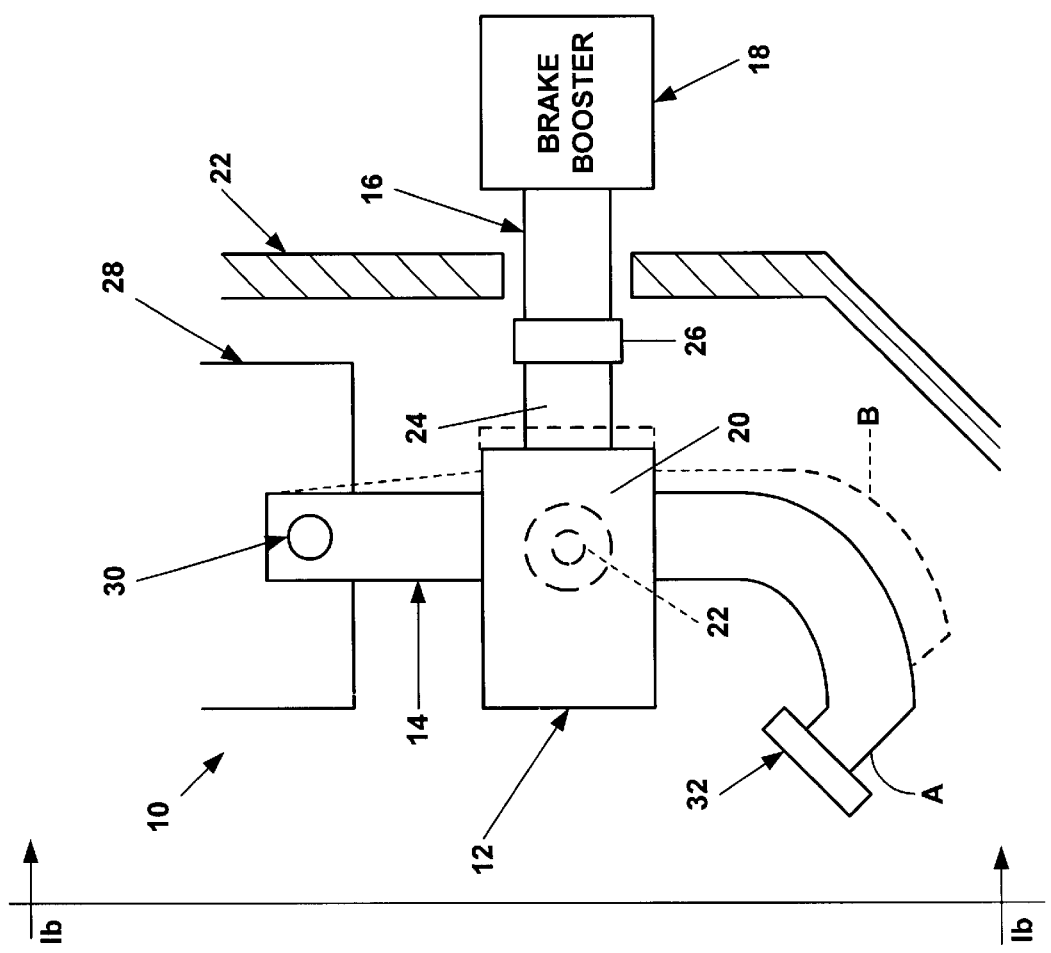

BRAKE PEDAL SHOCK ABSORBER AND METHOD

BACKGROUND

This invention relates generally to shock absorbers, and in particular to shock absorbers for use with actuating pedals.

Brake pedals permit drivers of motor vehicles to actuate the vehicle braking system. In the event of a front end impact to the motor vehicle, an impact force is typically applied to the front end of the vehicle for a limited time duration that is typically less than about one second. Unfortunately, the applied impact force is usually transmitted to the driver's leg by the brake pedal linkage. Conventional brake pedal linkages do not reduce or eliminate such impact forces. As a result, drivers of motor vehicles commonly suffer leg injuries due to impact forces applied during vehicle impacts.

The present invention is directed to overcoming one or more of the limitations of existing brake pedals.

SUMMARY

According to one embodiment of the present invention, a method of operating a motor vehicle braking system including a brake booster having a push rod that is actuated by a brake pedal lever arm is provided that includes compliantly coupling the brake pedal lever arm to the push rod during the application of an impulsive force to the push rod.

According to another embodiment of the present invention, a motor vehicle braking system is provided that includes a brake booster having a push rod, a brake pedal lever arm, and means for compliantly coupling the brake pedal lever arm to the push rod during the application of an impulsive force to the push rod.

According to another embodiment of the present invention, a motor vehicle braking system is provided that includes a brake booster having a push rod, a brake pedal lever arm, and a shock absorber coupled to the push rod and the brake pedal lever arm for compliantly coupling the brake pedal lever arm to the push rod during the application of an impulsive force to the push rod.

According to another embodiment of the present invention, an apparatus for coupling a first member to a second member is provided that includes means for compliantly coupling the first member to the second member after the application of an impulsive force to the second member, and means for absorbing the impulsive forces applied to the second member.

According to another embodiment of the present invention, a method of coupling a first member to a second member is provided that includes compliantly coupling the first member to the second member after application of an impulsive force to the second member, and absorbing the impulsive force applied to the second member.

According to another embodiment of the present invention, an apparatus for coupling a first member to a second member is provided that includes a housing including an hydraulic accumulator for absorbing energy, a metering orifice coupled to the hydraulic accumulator, an adjustable fluid reservoir coupled to the metering orifice, and a quantity of fluid positioned within the adjustable fluid reservoir and the metering orifice. A connecting rod is coupled to the housing for adjusting the size of the adjustable fluid reservoir. A locking device is provided for controllably locking the connecting rod to the housing. A sensor is provided for controlling the operation of the locking device.

According to another embodiment of the present invention, an apparatus for coupling a first member to a second member is provided that includes a housing having an hydraulic accumulator for absorbing energy, a metering orifice coupled to the hydraulic accumulator, an adjustable fluid reservoir coupled to the metering orifice, and a quantity of fluid positioned within the adjustable fluid reservoir and the metering orifice. A connecting rod is coupled to the housing for adjusting the size of the adjustable fluid reservoir. A locking device is provided for controllably locking the connecting rod to the housing that includes one or more radially movable locking members for rigidly coupling the connecting rod to the housing, and an accelerometer for controlling the movement of the locking members.

According to another embodiment of the invention, an apparatus for coupling a first member to a second member is provided that includes a housing having an hydraulic accumulator for storing energy, a metering orifice coupled to the hydraulic accumulator, a flow control valve coupled to the metering orifice, an adjustable fluid reservoir coupled to the flow control valve, and a quantity of fluid positioned within the metering orifice, and the adjustable fluid reservoir. A connecting rod is coupled to the housing for adjusting the size of the adjustable fluid reservoir. A sensor is provided for controlling the operation of the flow control valve.

The present embodiments of the invention provide shock absorbers for coupling a brake pedal lever arm to a brake booster push rod that sense the application of impact forces to the brake booster push rod and thereby compliantly couple the brake pedal lever arm to the brake booster push rod. The shock absorbers then absorb the impact forces applied to the brake booster push rod and then rigidly couple the brake pedal lever arm and the brake booster push rod upon sensing the cessation of the impact forces. As a result, the further transmission of the impact forces to a human operator of the brake pedal lever arm is prevented thereby avoiding potentially serious injury to the human operator.

BRIEF DESCRIPTION OF THE DRAWINGS

FIG. 1a is a fragmentary cross-sectional side view illustrating an embodiment of a braking system having a brake pedal shock absorber.

FIG. 1b is a front view of the braking system of FIG. 1 taken along the line 1b—1b of FIG. 1a.

DESCRIPTION OF THE PREFERRED EMBODIMENTS

Figure 2A:
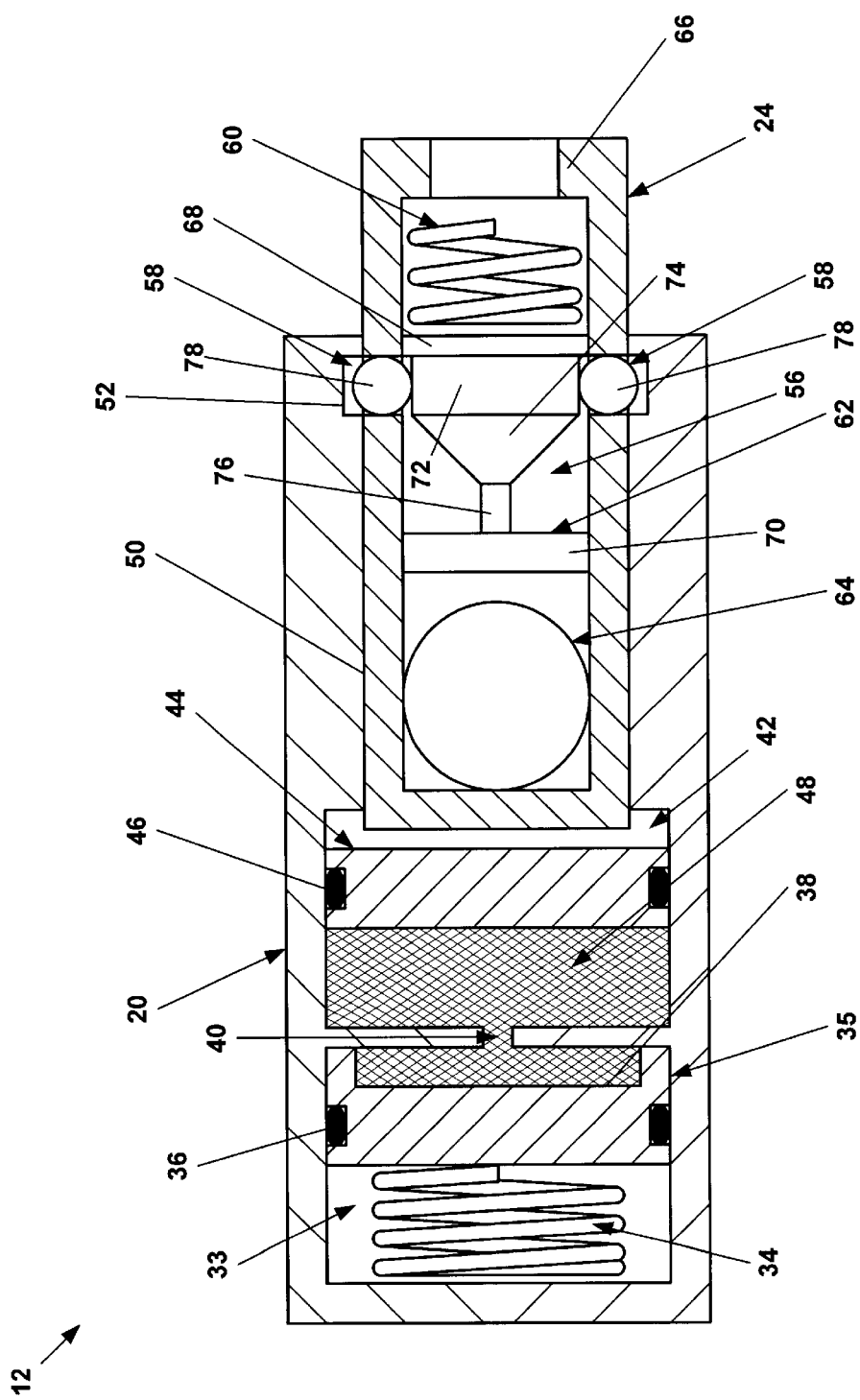
FIG. 2a is a fragmentary cross sectional view of a first embodiment of the brake pedal shock absorber taken along the line 2a—2a of FIG. 1b.

Referring to FIGS. 1a, 1b and 2a of the drawings, the reference numeral 10 refers, in general, to a braking system having a brake pedal shock absorber 12 for coupling a brake pedal lever arm 14 to a conventional push rod 16 for a conventional brake booster 18. The shock absorber 12 includes a housing 20 that is pivotally coupled to the lever arm 14 by a conventional pinned connection 22 and a connecting rod 24 that is coupled to an end of the push rod 16 by a conventional mechanical coupling 26. The lever arm 14 is pivotally coupled to the motor vehicle 28 by a conventional pinned connection 30 extending through the lever arm near one end thereof. A foot pedal 32 is coupled to the other end of the lever arm 14 to permit a driver of the vehicle 28 to actuate the brake booster 18 between a first position A and a second position B to thereby reduce the speed of the vehicle 28.

An accumulator chamber 33 is formed in the housing 20 that contains an accumulator return spring 34 and an accumulator piston 35. An O-ring seal 36 is provided in an exterior surface of the piston 35 for fluidicly sealing the interface between the piston 35 and the wall of the housing 20 defining the chamber 33. The piston 35 further includes a recessed portion 38 on an end face of the piston 35 opposite the spring 32 for reasons to be described.

A metering orifice 40 is also formed in the housing 20 that fluidicly couples a portion of the accumulator chamber 33 with a portion of a fluid reservoir chamber 42 also formed in the housing 20. A piston 44 is positioned within the fluid reservoir chamber 42 and includes an O-ring sealing member 46 for fluidicly sealing the interface between the piston 44 and the wall of the housing 20 defining the chamber 42. A body of fluid 48 is contained within the recessed portion 38 of the piston 35 within the accumulator chamber 33, the metering orifice 40, and the fluid reservoir 42 between the pistons 34 and 44 for reasons to be described.

A bore 50 is also formed in the housing 20 that is coupled to the fluid reservoir chamber 42, and includes an annular recessed portion 52 adjacent to an end of the housing 20.

The connecting rod 24 is received within the bore 50 and includes a bore 56 having a plurality of radial openings 58 and containing a locking ram return spring 60, a locking ram 62, and a trigger ball 64 for reasons to be described. The connecting rod 24 further includes an inner flange 66 for keeping the returning spring 60, locking ram 62, and trigger ball 64 within the bore 56.

The locking ram 62 includes a piston 68 at one end facing the locking ram return spring 60 and another piston 70 at another end facing the trigger ball 64. A cylindrical member 72 of reduced diameter extends from the piston 68, a conical member 74 extends from the cylindrical member 72, and a cylindrical member 76 extends from and couples the conical member 74 to the piston 70.

A plurality of locking balls 78 are provided that are adapted to be received within the openings 58 and the recess 52 for reasons to be described.

During normal operation of the system 10, the shock absorber 12 is adapted to permit the driver of the vehicle 28 to actuate the brake booster 18 by depressing the brake pedal 32. In particular, as illustrated in FIG. 2a, during normal operation, the locking balls 78 are held within the radial openings 58 and the recess 52 by the outer surface of the cylindrical member 72 of the locking ram 62. The locking ram 62 in turn is maintained in a substantially stationary position by the return spring 60. Because the locking balls 78 extend beyond the outer surface of the connecting rod 24 and into the recess 52, movement of the housing 20 in response to movement of the brake pedal lever arm 14 by the driver of the vehicle 28 is transferred to the connecting rod 24. In this manner, depression of the brake pedal 32 by the driver of the vehicle 28 results in actuation of the brake booster 18. The actuation of the brake booster 18 in turn actuates the brakes to reduce the speed of the vehicle 28 in a conventional manner.

Figure 2B:
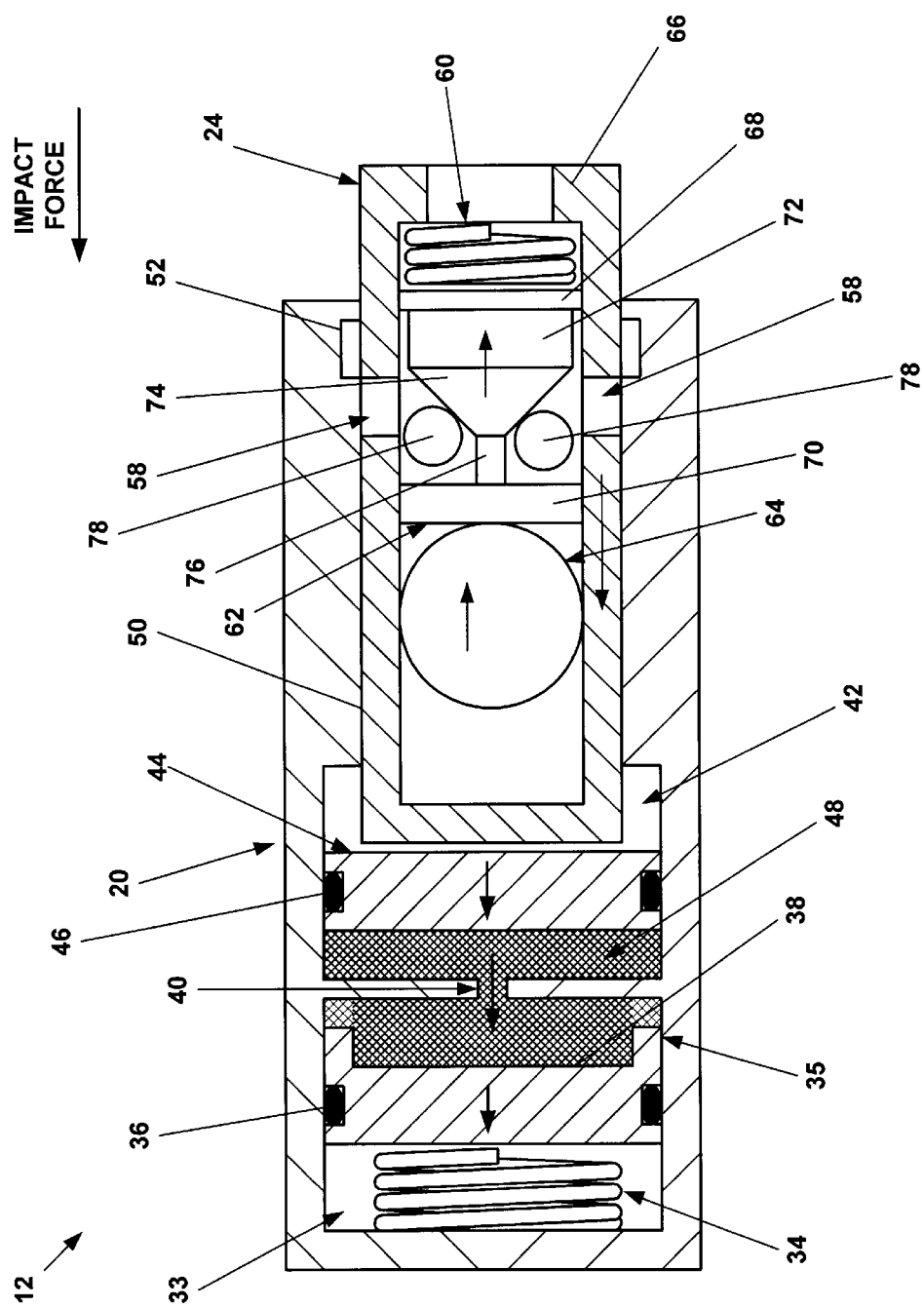
FIG. 2b is a fragmentary cross sectional view of the brake pedal shock absorber of FIG. 2a during the application of an impact force.

During the application of an impact force to the system 10, the shock absorber 12 is adapted to controllably compliantly couple the brake pedal lever arm 14 to the push rod 16 of the brake booster 18. In particular, as illustrated in FIG. 2b, during the application of an impact force in a direction from right-to-left, the trigger ball 64 is displaced in the opposite longitudinal direction with sufficient force to overcome the resilient force of the locking ram return spring 60. The displacement of the trigger ball 64 in turn displaces the locking ram 62 thereby releasing the locking balls 78 from the recess 52. In this manner, the shock absorber 12 senses the application of the impact force to the system 10. Furthermore, in this manner, the housing 20 is no longer rigidly locked to the connecting rod 24. In an exemplary embodiment, the locking balls 78 are released from the recess 52 during the application of an impact force greater than about 1.5 times the force of gravity.

The impact force applied to the system 10 is then absorbed by the remaining elements of the shock absorber 12. In particular, as illustrated in FIG. 2b, the application of the impact force also displaces the connecting rod 24 longitudinally in a right-to-left direction. The connecting rod 24 in turn impacts the piston 44 thereby forcing fluid 48 out of the fluid reservoir chamber 42 through the metering orifice 40 and into the recess 38 of the piston 35 positioned in the accumulator chamber 33. Since the fluid 48 is incompressible, the injection of the fluid 48 into the recess 38 of the piston 35 applies a force to the surface of the recess 38 that displaces the piston 35 longitudinally in a right-to-left direction within the accumulator chamber 33. Furthermore, the surface area provided by the recess 38 of the piston 35 facilitates the initial displacement of the piston 35 by the injection of the fluid 48.

During the displacement of the piston 35, the rate of flow of fluid 48 into the accumulator chamber 33 is limited by the metering orifice 40 and is resisted by the spring force provided by the accumulator return spring 34. In this manner, the impact energy applied by the connecting rod 24 to the piston 44 is absorbed by the flow of the fluid 48 into the accumulator chamber 33. In an exemplary embodiment, the size of the metering orifice 40 is selected to permit the accumulator chamber 33 to be completely filled in about 0.4 to 0.8 seconds upon the application of the maximum possible impact force.

After the cessation of the impact force, the accumulator spring 34 applies a spring force to the piston 35, urging it in a left-to-right longitudinal direction, thereby forcing the fluid 48 out of the accumulator chamber 33 through the metering orifice 40 and back into the fluid reservoir chamber 42. The movement of the fluid 48 back into the fluid reservoir chamber 42 in turn displaces the piston 44 into contact with the end of the connecting rod 24 thereby displacing the connecting rod back 54 to its original position. In parallel, the locking ram return spring 60 applies a spring force to the locking ram 62 thereby forcing the locking balls 78 back into their original position within the radial openings 58 and recess 52. In this manner, the shock absorber 12 senses the cessation of the impact force. Furthermore, in this manner, after the cessation of the impact force, the housing 20 is once again rigidly coupled to the connecting rod 24 so that depression of the brake pedal 32 actuates the brake booster 18 via the shock absorber 12.

Figure 3A:
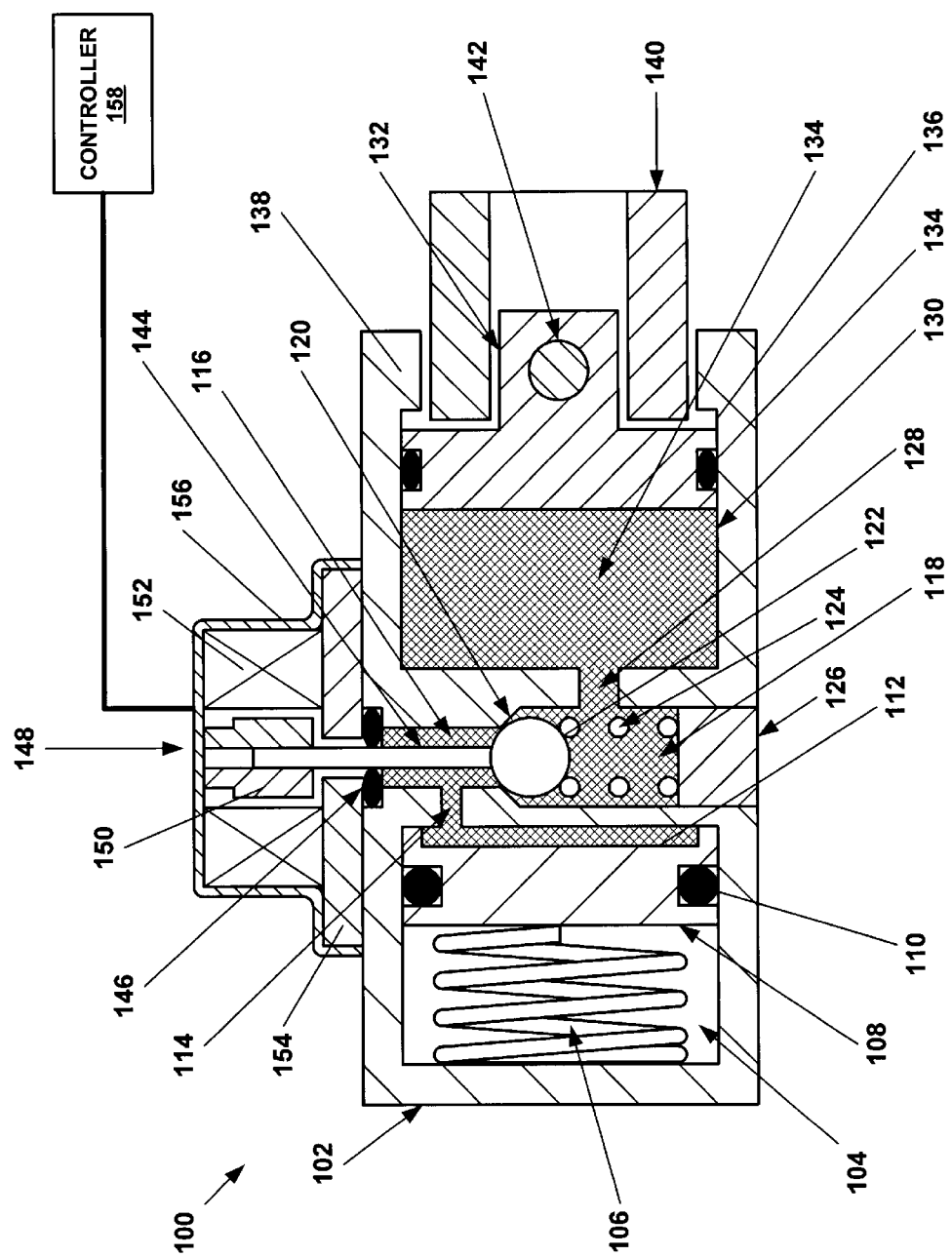
FIG. 3a, is a fragmentary cross sectional view of a second embodiment of the brake pedal shock absorber.

Referring now to FIG. 3a, an alternative embodiment of a shock absorber 100 for use in the system 10 includes a housing 102 that is pivotally coupled to the brake pedal lever arm 14 by the pinned connection 20. An accumulator chamber 104 is formed within the housing 102 that contains an accumulator return spring 106 and an accumulator piston 108. An O-ring seal 110 is provided in an exterior surface of the piston 108 for fluidicly sealing the interface between the piston 108 and the wall of the housing 102 defining the chamber 104. The piston 108 further includes a recessed portion 112 on an end face of the piston 108 opposite the spring 106 for reasons to be described.

A metering orifice 114 also formed in the housing 102 fluidicly couples a portion of the accumulator chamber 104 with a throat passage 116 also formed in the housing 102. The throat passage 116 is coupled to a check valve spring chamber 118 also formed in the housing 102 that includes a restricted portion 120. A check ball valve 122 is positioned within the spring chamber 118 and urged against the restricted portion 120 by a check valve return spring 124. A threaded plug 126 is removably coupled to the housing 102 that permits the check ball valve 122 and return spring 124 to be assembled within the chamber 108.

A flow passage 128 is also formed in the housing 102 that fluidicly couples the spring chamber 118 with a portion of a fluid reservoir chamber 130 also formed in the housing 102. A piston 132 is positioned within the fluid reservoir chamber 130 that includes an O-ring sealing member 134 for fluidicly sealing the interface between the piston 132 and the wall of the housing 102 defining the chamber 130.

A body of fluid 134 is contained within the recess 112 of the piston 108 within the accumulator chamber 104, the metering orifice 114, the throat passage 116, the spring chamber 118, the flow passage 128, and the fluid reservoir chamber 130 between the pistons 108 and 132 for reasons to be described.

A bore 136 is also formed in the housing 102 that is coupled to the fluid reservoir chamber 130 and includes an inner flange 138 for retaining the piston 132. A connecting rod 140 is received within the bore 136 that is coupled to an end of the piston 132 by a conventional pinned connection 142. The end of the connecting rod 140 extending out of the housing 102 is adapted to be coupled to the push rod 16 of the brake booster 18 by the conventional mechanical coupling 26.

A pintle 144 is received within the throat passage 116 for reasons to be described. A sealing member 146 is positioned in an upper portion of the throat passage 116 and seals the interface between the pintle 144 and the throat passage 116.

A solenoid actuator 148 is coupled to the housing 102 and is adapted to controllably displace the pintle 144. In this manner, the pintle 144 controllably displaces the ball check valve 122 thereby permitting the fluid 134 to be transferred from the fluid reservoir chamber 130 through the fluid passage 128, spring chamber 118, throat passage 116, and metering orifice 114 into the accumulator chamber 104. The solenoid actuator 148 includes a conventional solenoid armature 150 for receiving a portion of the pintle 144. The solenoid armature 150 in turn is contained within a conventional solenoid coil 152. The solenoid coil 152 is supported by a conventional flux plate 154. A housing 156 contains and couples the solenoid actuator 148 to the housing 102. The design and general theory of operation of the solenoid actuator 148 is considered well known.

A controller 158 is coupled to the solenoid actuator 148 that controls the operation of the solenoid actuator 148 in a manner to be described. In several exemplary embodiments, the controller 158 senses the impact force acting on the vehicle 28 and includes conventional mechanical, air bag, electronic accelerometer, and/or other sensors suitable for sensing impact forces.

During normal operation of the system 10, the shock absorber 100 is adapted to permit the driver of the vehicle 28 to actuate the brake booster 18 by depressing the brake pedal 32. In particular, as illustrated in FIG. 3a, during normal operation, the check ball valve 112 is held against the restricted portion 110 thereby preventing the passage of the fluid 124 out of the spring chamber 118. In this manner, the shock absorber 100 is hydraulically locked thereby providing a rigid connection between the housing 102 and the connecting rod 130. In this manner, depression of the brake pedal 32 by the driver of the vehicle 28 results in actuation of the brake booster 18. The actuation of the brake booster 18 in turn actuates the brakes to reduce the speed of the vehicle 28 in a conventional manner.

Figure 3B:
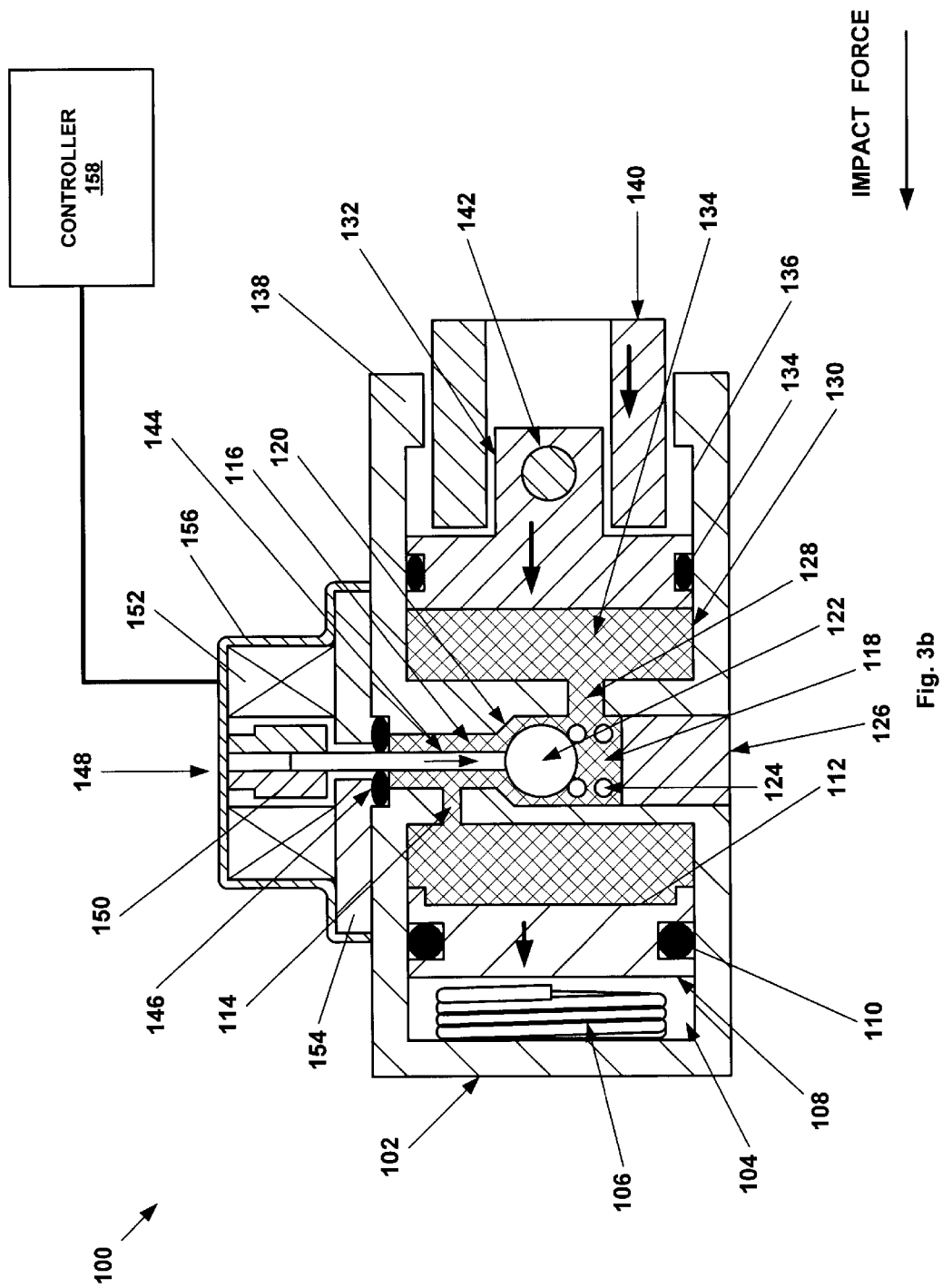
FIG. 3b is a fragmentary cross sectional view of the brake pedal shock absorber of FIG. 3a during the application of an impact force.

During the application of an impact force to the system 10, the shock absorber 100 is adapted to controllably compliantly couple the brake pedal lever arm 14 to the push rod 16 of the brake booster 18. In particular, as illustrated in FIG. 3b, during the application of an impact force in a direction from right-to-left, the solenoid actuator 148 controllably displaces the pintle 144 in a downward direction thereby moving the check ball valve 122 away from the restricted portion 120. In an exemplary embodiment, the pintle 144 is displaced in the downward direction when the impact force applied to the front of the vehicle 28 that is sensed by the controller 158 is greater than about 1.5 times the force of gravity. In this manner, the housing 102 is no longer hydraulically locked to the connecting arm 140.

The impact force applied to the system 10 is then absorbed by the remaining elements of the shock absorber 100. In particular, as illustrated in FIG. 3b, the application of the impact force also displaces the connecting rod 140 in the same longitudinal direction. The connecting rod 140 in turn displaces the piston 132 thereby forcing fluid 134 out of the fluid reservoir chamber 130 through the passage 128, spring chamber 118, throat passage 116, and metering orifice 114 and into the recess 112 of the piston 108 within the accumulator chamber 104. Since the fluid 134 is incompressible, the injection of the fluid 134 into the recess 112 of the piston 108 applies a force that displaces the piston 108 in the right-to-left direction within the accumulator chamber 104. Furthermore, the surface area provided by the recess 112 of the piston 108 facilitates the initial displacement of the piston 108 by the injection of the fluid 134.

During the displacement of the piston 108, the rate of flow of fluid 134 into the accumulator chamber 104 is limited by the metering orifice 114 and is resisted by the spring force provided by the accumulator return spring 106. In this manner, the impact energy applied by the connecting rod 140 to the piston 132 is absorbed by the flow of the fluid 134 into the accumulator chamber 104. In an exemplary embodiment, the size of the metering orifice 114 is selected to permit the accumulator chamber 104 to be completely filled in about 0.4 to 0.8 seconds upon the application of the maximum possible impact force. In an alternative embodiment, the position of the pintle 116 is controllably varied in order to variably meter the flow of the fluid 134 through the restricted portion 120. In an exemplary embodiment, the pintle 144 is displaced in the downward direction for a duration of approximately 1 second in order to decouple the housing 102 from the connecting rod 140 and absorb the impulse forces.

After the cessation of the impact force, the accumulator spring 106 applies a spring force to the piston 108, urging it in a left-to-right longitudinal direction, thereby forcing the fluid 134 out of the accumulator chamber 104 through the metering orifice 114, throat passage 116, spring chamber 118, and fluid passage 128 and back into the fluid reservoir chamber 130. The movement of the fluid 134 back into the fluid reservoir chamber 130 in turn displaces the piston 132 and the connecting rod 140 to their original positions. The pintle 144 is then retracted to its original position by the solenoid actuator 148 thereby permitting the check ball return spring 124 to force the check ball valve 122 back to its original position against the surface of the restricted portion 120. In an exemplary embodiment, the pintle 144 is retracted to its original position a predetermined time period after the controller 158 senses the cessation of the impact force. In this manner, the shock absorber 100 senses the cessation of the impact force. Furthermore, in this manner, the housing 102 is once again rigidly coupled to the connecting rod 140 after the cessation of the impact forces so that depression of the brake pedal 26 actuates the brake booster 18 via the shock absorber 100.

The brake pedal shock absorbers of the present disclosure provide several advantages. For example, the present brake pedal shock absorbers prevent serious injury to the driver of the motor vehicle by controllably compliantly coupling the brake pedal lever arm to the actuating rod for the brake booster and absorbing the impact forces applied to the brake booster actuating rod. Furthermore, the present brake pedal shock absorbers then rigidly couple the brake pedal lever arm to the actuating rod for the brake booster upon the cessation of the impact forces thereby returning full braking function. In addition, the present brake pedal shock absorbers incorporate sensors that sense the level of the impact forces to permit the threshold level of impact force to be controlled and preselected. In this manner, the point at which the brake pedal lever arm is no longer rigidly coupled to the actuating rod for the brake booster can be optimized. In addition, the use of hydraulic systems for absorbing the impact forces provides an efficient and compact device. Therefore, the brake pedal shock absorbers of the present disclosure prevent serious leg injuries to drivers in the event of a frontal impact to a vehicle using a highly efficient and durable device.

It is understood that variations may be made in the foregoing without departing from the scope of the invention. For example, the geometry of the various elements of the shock absorbers 12 and 100 may be varied to provide a threshold level of impact loading for decoupling and energy absorption that may vary as a function of the particular anticipated operating conditions of the vehicle 28. In addition, the recesses 38 and 112 may be omitted. Furthermore, the controller 58 may be formed integrally to the housing 102 of the brake pedal shock absorber 100 in order to provide a self contained device. Finally, while described in terms of a shock absorber for a brake pedal lever arm, the shock absorbers 12 and 100 may be used to controllably decouple and absorb impact loads between any number of elements in order to minimize the unwanted transfer of impulse loads between such elements.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A motor vehicle braking system, comprising:
   a brake booster coupled to a connecting rod;
   a brake pedal lever arm; and
   means for compliantly coupling the brake pedal lever arm to the connecting rod during the application of an impact force to the connecting rod including:
   a shock absorber housing, the connecting rod being mounted in the housing;
   an accumulator portion in the housing including a first resiliently urged piston having a recess formed therein;
   a reservoir portion in the housing including a second piston;
   an orifice formed in the housing for metering fluid between the first and second pistons;
   the housing having a bore formed therein receiving the connecting rod and coupled to the reservoir portion, the bore including a radial opening formed therein; and
   a locking means including means normally retained in the radial opening for rigidly locking the connecting rod with the housing, and releasable from the opening for unlocking the connecting rod from the housing.

2. The system of claim 1 wherein the locking means further includes a resiliently urged conical member movable within the connecting rod, and means responsive to impact, for moving the conical member.

3. The system of claim 2 wherein movement of the conical member releases the locking means retained in the radial opening for unlocking the rod from the housing, whereby the first and second pistons are moved and fluid is metered through the orifice.

4. The system of claim 3 wherein the locking means normally retained in the radial opening includes a locking ball.

5. The system of claim 4 wherein the means for moving the conical member is a trigger ball.

6. A motor vehicle braking system, comprising:
   a brake booster coupled to a connecting rod;
   a brake pedal lever arm; and
   a shock absorber coupled to the connecting rod and the brake pedal lever arm for compliantly coupling the brake pedal lever arm to the connecting rod during the application of an impact force to the connecting rod including:
   a shock absorber housing, the connecting rod being mounted in the housing;
   an accumulator portion in the housing including a first resiliently urged piston having a recess formed therein;
   a reservoir portion in the housing including a second piston;
   an orifice formed in the housing for metering fluid between the first and second pistons;
   the housing having a bore formed therein receiving the connecting rod and coupled to the reservoir portion, the bore including a plurality of radial openings formed therein; and
   a locking means including means normally retained in the radial opening for rigidly locking the connecting rod with the housing, and releasable from the opening for unlocking the connecting rod from the housing.

7. The system of claim 6 wherein the locking means further includes a resiliently urged conical member movable within the connecting rod, and means responsive to impact, for moving the conical member.

8. The system of claim 7 wherein movement of the conical member releases the locking means retained in the radial openings for unlocking the rod from the housing, whereby the first and second pistons are moved and fluid is metered through the orifice.

9. The system of claim 8 wherein the locking means includes a plurality of locking balls.

10. The system of claim 9 wherein the means for moving the conical member is a trigger ball.

* * * * *